United States Patent [19]

Hilford

[11] Patent Number: 5,254,812
[45] Date of Patent: Oct. 19, 1993

[54] WEIGHING SCALE PLATFORM HAVING FOLDABLE ENVELOPE SUPPORT

[75] Inventor: Michael H. Hilford, Newport Beach, Calif.

[73] Assignee: Micro General Corporation, Santa Ana, Calif.

[21] Appl. No.: 988,847

[22] Filed: Dec. 10, 1992

[51] Int. Cl.$^5$ ............................................. G01G 21/22
[52] U.S. Cl. ..................................... 177/262; 177/253
[58] Field of Search ................................ 177/253, 262

[56] References Cited

U.S. PATENT DOCUMENTS

| | | | |
|---|---|---|---|
| 1,667,891 | 5/1928 | Hapgood | 177/262 |
| 2,459,065 | 1/1949 | Dohl | 177/262 |
| 3,250,339 | 5/1966 | Ruskin | 177/262 |
| 4,368,791 | 1/1983 | Jakson | 177/262 X |
| 5,050,694 | 9/1991 | Liang | 177/262 |

Primary Examiner—Mark J. Reinhart
Assistant Examiner—Randy W. Gibson
Attorney, Agent, or Firm—William L. Chapin

[57] ABSTRACT

An improved platform for scales used to weigh parcels and envelopes for shipping has a hoop-shaped wire bail having at both rear end portions thereof a short, laterally inwardly projecting pivot leg. The pivot legs are axially aligned, and are pivotably attached to the platform in a manner permitting the bail to be pivoted upward and rearward from a position in which the plane of the bail lies below the surface of the platform, to an upright position in which envelopes placed on the platform may be leaned rearward against the bail, thus covering less of the platform and improving the viewability of a weight indicator located below the platform. Stop lugs in the platform located rearward of the pivot legs limit rearward motion of the bail to a position in which the plane of the bail is inclined slightly rearward of a plane perpendicular to the platform. In the preferred embodiment, a plurality of laterally disposed, longitudinally spaced apart grooves is formed in the upper surface of the platform, to receive the lower edge of an envelope and prevent the envelope from slipping off the platform.

23 Claims, 3 Drawing Sheets

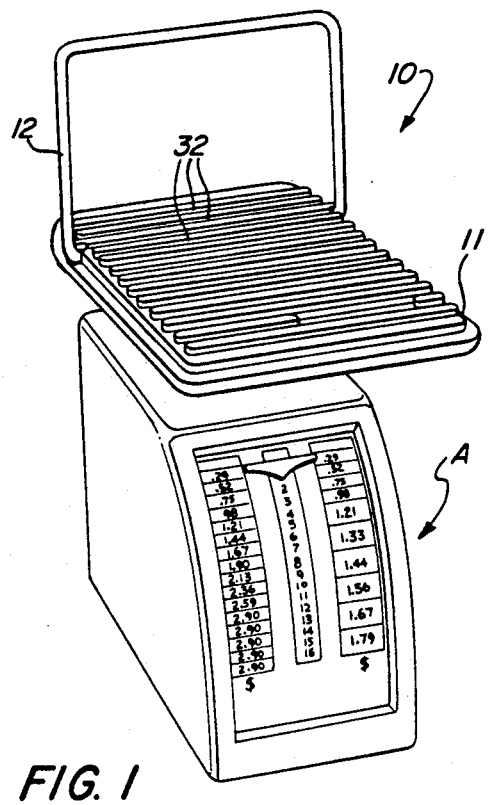
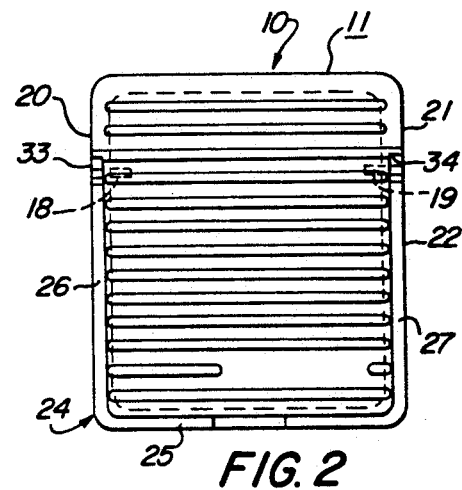
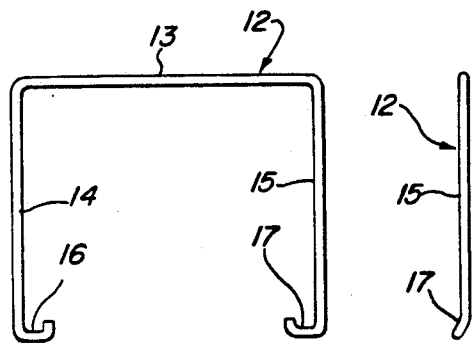
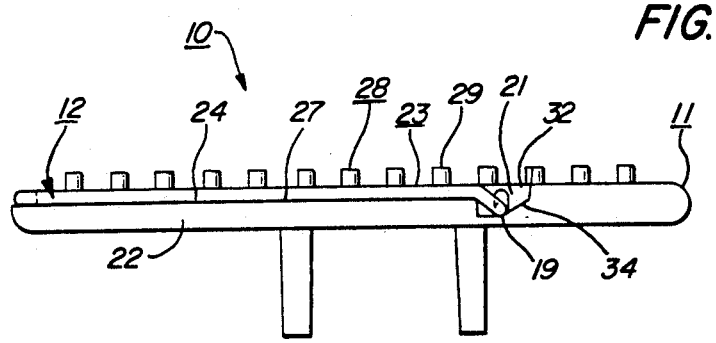
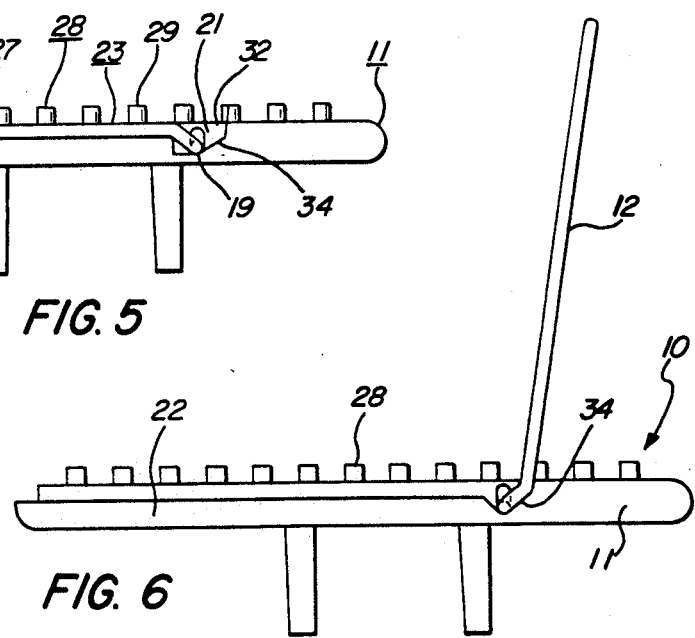

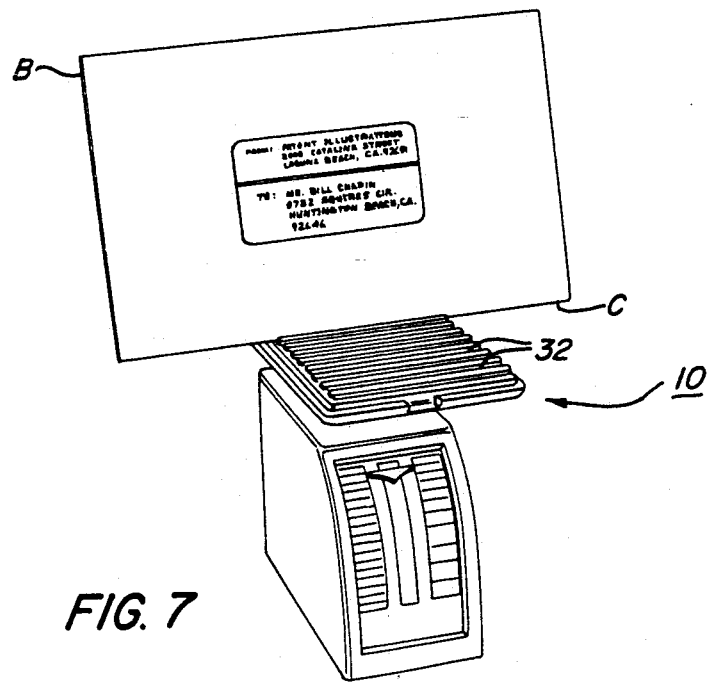
FIG. 7
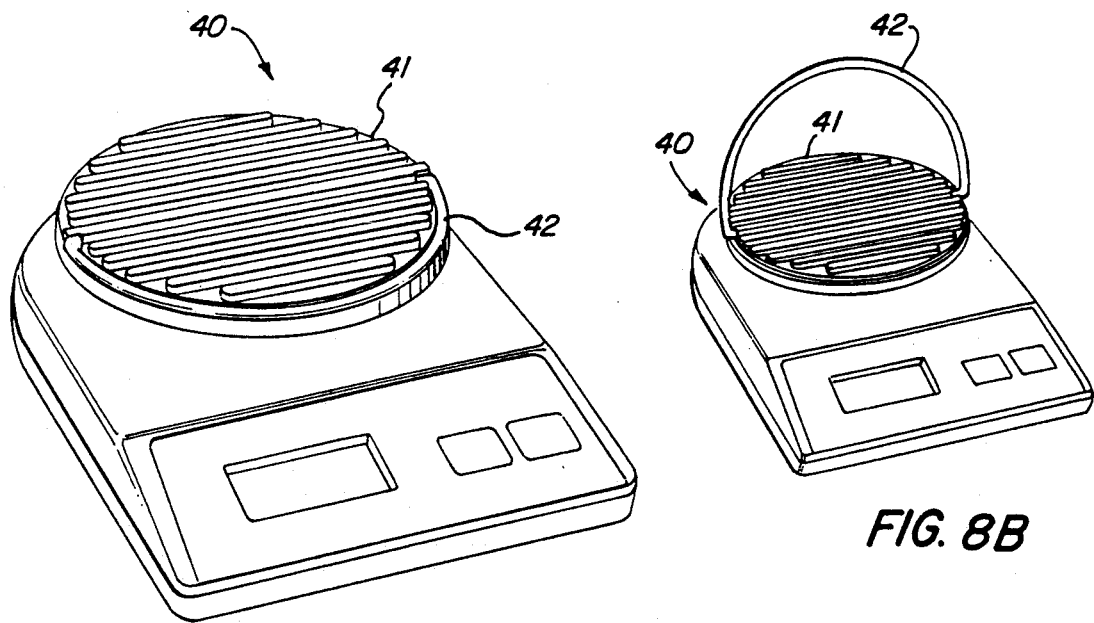
FIG. 8A
FIG. 8B

WEIGHING SCALE PLATFORM HAVING FOLDABLE ENVELOPE SUPPORT

BACKGROUND OF THE INVENTION

A. Field of the Invention

This invention relates to scales used to weigh parcels for shipping and mailing. More particularly, the invention relates to an improved platform for weighing scales, the platform having a structure for supporting parcels and envelopes having a footprint larger than the platform.

B. Description of Background Art

Weighing scales are used extensively in mailing and shipping operations for determining postage or shipping charges for parcels or envelopes. Typically, such weighing scales have a platform with a generally flat, horizontally disposed upper surface for receiving parcels or envelopes to be weighed. A mechanical or electronic force transducer mechanically coupled to the platform is operably interconnected with a rotary or linear indicator dial, or an electronics display device, which indicates the weight of an article placed on the platform.

Usually, the weight indicator or display device of a weighing scale is mounted on a housing which supports the scale platform. Thus, if a large parcel or envelope is placed flat on the scale platform, the indicator may not be viewable from locations above the platform. Since weighing scales are usually placed on benches or tables at waist level, the head of a person using the scale is usually positioned some distance above the scale. Therefore, if a large parcel or envelope blocks the line of sight between a person and the scale indicator, the person must squat for perform some other bodily movement to be able to read the indicator. The present invention was conceived of to provide means for increasing the viewability of weighing scales while weighing large parcels or envelopes, thus eliminating in many cases the requirement for users of the scale to shift their position in order to be able to view the scale indicator.

OBJECTS OF THE INVENTION

An object of the present invention is to provide an improved platform design for weighing scales, in which a parcel or envelope may be supported in an angled, generally vertically disposed position relative to the platform, thereby eliminating overhang of the parcel over the scale indicator and affording viewability of the indicator from locations above the scale.

Another object of the invention is to provide a parcel support device for platforms of weighing scales which may be folded flush with the platform when not in use.

Another object of the invention is to provide an improved platform for weighing scales that incorporates an integral bail which may be folded flush with the platform when not in use, and into an upright position for supporting in an upright position large envelopes or parcels, i.e., those having a maximum perimeter dimension or footprint larger than that of the platform.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends an improvement in weighing scale platforms. The improved weighing scale platform according to the present invention allows parcels, envelopes or other objects having a base area or "footprint" larger than the area of the platform to be supported in a generally vertically oriented position relative to the platform. This arrangement minimizes overhang of the object outside the perimeter of the scale platform. With the object supported vertically rather than flat on the upper horizontal surface of the platform, a weight indicator or display mounted below the platform on a panel of the scale is more readily viewable.

The improved platform for weighing scales according to the present invention includes a wire bail having a front segment and side segments lying in a common flat plane. Each of the two side segments terminates at the rear end thereof in a short, laterally inwardly disposed leg which is pivotably received in a separate one of a pair of bores disposed laterally inwards from opposite sides of the platform, near the rear edge wall therefore. With the bail in a folded down, non-operative position, the bail lies below and concentrically encircles the front and sides of the platform.

Stop means are included in the platform to limit upward pivotal motion of the bail to a total excursion of slightly greater than ninety degrees, i.e., from a forward, non-operating position flush with the platform to an upright, slightly rearward tilting operable position. With the bail in an upright, operable position, large envelopes or parcels may be placed on the platform in a vertical position, leaning back against the bail. In the preferred embodiment, a plurality of laterally disposed, raised ribs is formed in the upper surface of the platform. Grooves between adjacent ribs are adapted to receive an envelope oriented in a vertical position. This construction allows an envelope to lean backward against the bail, while a rib forward of the lower edge of the envelope prevents the lower edge of the envelope from sliding forward on the platform, thereby preventing the envelope from falling down into a flat position on the platform.

BRIEF DESCRIPTION OF THE DRAWINGS

FIG. 1 is a front perspective view of a weighing scale including a platform having a foldable envelope/parcel support according to the present invention.

FIG. 2 is an upper plan view of the weighing scale platform of FIG. 1.

FIG. 3 is an upper plan view of a bail forming part of the article of FIG. 2.

FIG. 4 is a side elevation view of the bail of FIG. 3.

FIG. 5 is a side elevation view of the platform of FIG. 2, with the bail in a folded down, non-operating position.

FIG. 6 is a side elevation view similar to that of FIG. 5, but showing the bail in an upright operable position.

FIG. 7 is a front perspective view of the apparatus of FIG. 1, showing the bail in an operating position, supporting an envelope.

FIG. 8A is a perspective view of another embodiment of the invention, showing a bail comprising part of the apparatus in a folded down, non-operating position.

FIG. 8B is a perspective view similar to that of FIG. 8A but showing the bail in an upright position supporting an envelope.

DETAILED DESCRIPTION OF THE INVENTION

Figure 9:
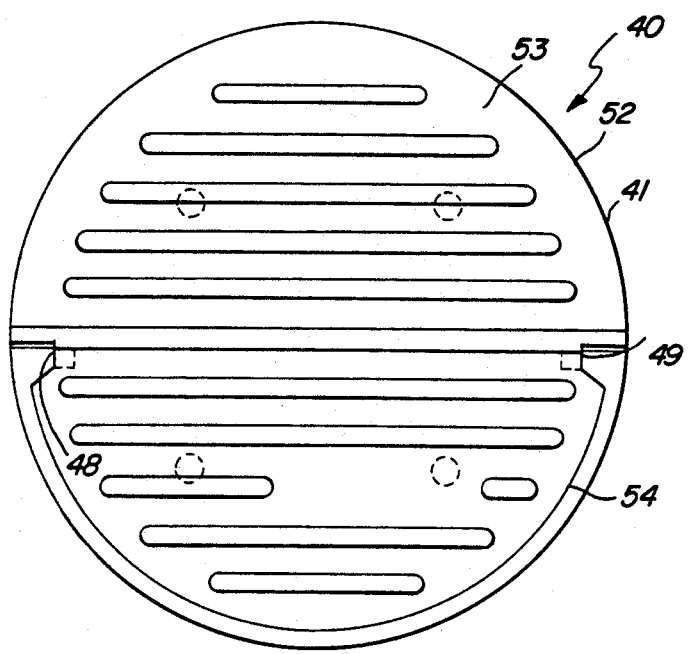
FIG. 9 is an upper plan view of the weighing scale platform of FIGS. 8A & 8B.
Figure 12:
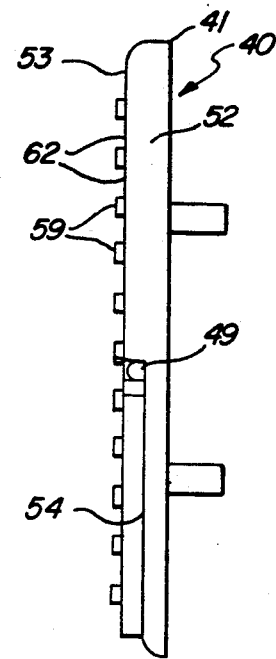
FIG. 12 is a side elevation view of the platform of FIG. 9, with the bail in a folded down, non-operating position.

Referring now to FIGS. 1 through 7, an improved platform for weighing scales, which has an integral foldable envelope support bail, is shown.

FIG. 1 is a perspective view of a weighing scale A having an improved weighing scale platform 10 according to the present invention. As shown in FIG. 1, platform 10 includes a generally rectangular-shaped body 11, and a bail 12. FIG. 1 shows bail 12 in an upright, operable position, while FIG. 2 shows the bail in a non-operating position, folded down flush with body 11.

As may be seen best by referring to FIGS. 3 and 4, bail 12 has the shape of an elongated length of wire formed into an open polygon having a front straight segment 13 and left and right straight side segments 14 and 15 disposed perpendicularly to the front segment. Side segments 14 and 15 terminate at the rear ends thereof in short, laterally inwardly protruding legs 16 and 17, respectively. As shown in FIGS. 3 and 4, legs 16 and 17 may have curved tips and are inclined to the plane of base 12. However, neither of these construction features are essential, as will be made clear below.

Referring to FIGS. 2 and 5, platform 10 may be seen to include a pair of coaxial bores 18 and 19 extending laterally inwards into left and right side walls 20 and 21, respectively, of rectangular-shaped body 11. Bores 18 and 19 are adapted to insertably receive left and right short legs 16 and 17, respectively, of bail 12. Preferably, bail 12 is made of a springy material, such as heavy gauge steel wire. Thus fabricated, bail 12 may be attached to body 11 of platform 10 by deforming left and right side segments 14 and 15 of the bail laterally outwards, aligning short legs 16 and 17 with bores 18 and 19, and allowing the bail to assume its undeformed, generally rectangular shape, thereby causing the short legs to be insertably received and captivated in the bores.

In the preferred embodiment of platform 10, rectangular-shaped body 11 has a rectangular lower base 22 and a concentric rectangular boss section 23 that protrudes upward from the base. Thus formed, body 11 has a ledge 24 having a front segment 25 and left and right segments 26 and 27. As may be seen best by referring to FIG. 5, ledge 24 is adapted to support bail 12 in a flat, horizontal position when the bail is folded forward into a non-operable position. In this position, bail 12 is below the upper surface 28 of boss 23, and concentrically encircles the front and sides of the boss.

FIG. 5 is a side elevation view of weighing scale platform 10, with bail 12 in a folded down position. As shown in FIGS. 5 and 2, upwardly protruding boss section 23 of rectangular-shaped body 11 preferably includes a plurality of parallel, laterally disposed rectangular ribs 29 protruding upwards from upper surface 28 of the boss section at regular longitudinal intervals. The upper surfaces 30 of ribs 29 lie in a common horizontal plane adapted to support parcels or other objects to be weighed.

As shown in FIG. 2, ribs 29 form therebetween a plurality of laterally disposed grooves or channels 32 spaced apart at regular longitudinal intervals. As may be seen best by referring to FIGS. 1 and 7, channels 32 are adapted to receive the lower edge C of an envelope B placed in an upright position, propped up against bail 12 in an upright position.

As shown in FIG. 6, platform 10 includes means for securing bail 12 in an elevated position. Thus, as shown in FIGS. 2, 5 and 6, rectangular-shaped body 11 of platform 10 has formed therein a pair of upwardly protruding lugs 33 and 34 located rearward of left and right bail support pivot bores 18 and 19, respectively.

FIGS. 8A through 12 show another embodiment of an improved weighing scale platform according to the present invention. The improved weighing scale platform 40 shown in FIGS. 8A-12 has a generally circular-shaped body 41 having a circular base section 52 and an upwardly protruding, concentric circular boss section 53. Thus formed, body 41 has a ledge 54 having the shape of a circular arc.

Figure 10:
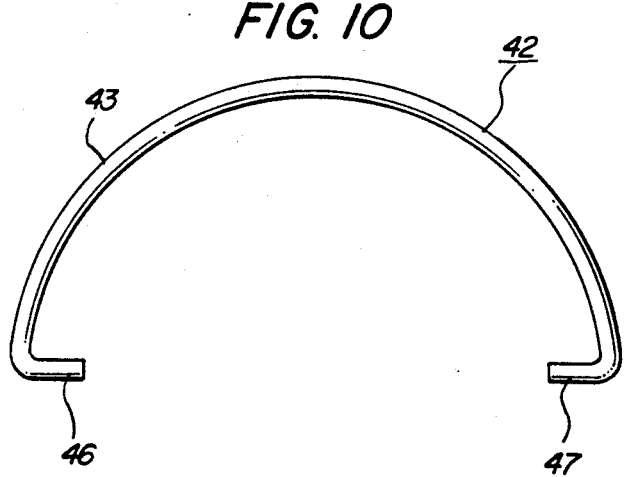
FIG. 10 is an upper plan view of a bail forming part of the article of FIG. 9.
Figure 11:
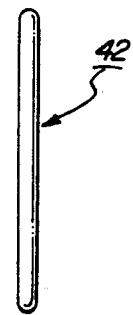
FIG. 11 is a side elevation view of the bail of FIG. 10.

As may be seen best by referring to FIGS. 10 and 11, circular weighing scale platform 40 includes a bail 42 formed of heavy gauge steel wire bent into a planar form having an arc-shaped front segment 43. The rear end portions of front segment 43 of bail 42 terminate in short, laterally inwardly protruding left and right legs 46 and 47. Legs 46 and 47 are pivotably held in left and right axially aligned bores 48 and 49, respectively, provided in opposite sides of boss section 53 of body 41.

Circular weighing platform 40 also includes left and right stop lugs 63 and 64 positioned behind bail 42, for supporting the bail in an upright position. Preferably, boss section 53 of body 41 has formed therein a plurality of parallel, laterally disposed raised rectangular cross-section ribs, spaced apart at equal longitudinal intervals. Thus formed, boss section 53 of platform 40 has a plurality of laterally disposed channels 62, one each between each pair of ribs 59. Channels 62 are adapted to receive the lower edge of an envelope leaning in an upright position against bail 42, in the same manner as described above for rectangular weighing platform 10.

What is claimed is:

1. An improved platform for weighing scales comprising;
   a. a thin, slab-shaped body having an upper surface adapted to support an object to be weighed,
   b. an object support member,
   c. means for pivotably attaching said object support member to said body in a manner permitting said support member to be pivoted upward from a non-operating position below said upper surface of said body to an upright, operable position, whereby an object may be placed on said upper surface of said body and leaned back against said support member, and
   d. means for impeding rearward motion of said support member.

2. The scale platform of claim 1 whereby said means for impeding rearward motion of said support member is further defined as means limiting rearward pivotability of said object support member relative to said slab-shaped body.

3. The scale platform of claim 1 wherein said object support member is further defined as being a bail having the general shape of an open polygon approximately concentric with the front portion of said slab-shaped body and foldable down into a non-operating position below the upper surface of said slab-shaped body, said bail being pivotably attached at the rear portion thereof to the rear portion of said slab-shaped body.

4. The scale platform of claim 3 wherein said bail is further defined as being a generally planar body formed into a hoop having a rearward facing opening.

5. The scale platform of claim 4 wherein said means for pivotably attaching said hoop-shaped bail to said slab-shaped body is further defined as comprising in combination;
   a. a pair of axially aligned short legs, one each protruding laterally inwards from the rear end portion of each side of said bail, and
   b. a pair of axially aligned bores, one each extending laterally inwards into an opposite lateral side of said slab-shaped body, said bores being adapted to insertably receive said legs.

6. The scale platform of claim 5 wherein said slab-shaped body is further defined as including a generally flat base section and a generally flat concentric boss section of smaller area protruding upwards from said base section, said body having at the junction between said base section and said boss section a ledge having a generally polygonal shape adapted to support said bail in a folded down position.

7. The scale platform of claim 6 wherein said bores for pivotably supporting said bail are further defined as being located in said boss section of said slab-shaped body, above said ledge and slightly forward of the rear edge wall of said slab-shaped body.

8. The scale platform of claim 7 wherein said means for limiting rearward pivotability of said bail is further defined as a pair of stop lugs formed in said slab-shaped body, said lugs being located rearward of said bores.

9. The scale platform of claim 8 wherein said slab-shaped body is further defined as having a generally rectangular plan-view shape.

10. The scale platform of claim 9 wherein said bail is further defined as being a generally planar body having a straight, laterally disposed front segment, parallel side segments protruding perpendicularly rearwards from opposite lateral ends thereof, and short laterally disposed legs protruding laterally inwards from the rear end portions of said side segments.

11. The scale platform of claim 10 wherein said bail is further defined as being a single piece of bent, heavy gauge wire.

12. The scale platform of claim 9 wherein said boss section of said slab-shaped body is further defined as having formed therein a plurality of laterally disposed, longitudinally spaced apart grooves, or channels.

13. The scale platform of claim 8 wherein said slab-shaped body is further defined as having a generally circular plan-view shape.

14. The scale platform of claim 13 wherein said bail is further defined as being a generally planar body including an arc-shaped front segment and short laterally disposed legs protruding laterally inwards from the rear end portions of said arc-shaped segment.

15. The scale platform of claim 14 wherein said bail is further defined as being a single piece of heavy gauge wire.

16. The scale platform of claim 13 wherein said boss section of said slab-shaped body is further defined as having formed therein a plurality of laterally disposed, longitudinally spaced apart grooves or channels.

17. In a weighing scale of the type having a generally flat, horizontally disposed platform for receiving parcels, envelopes and similar objects to be weighed, a force transducer coupled to said platform and means for indicating weight coupled to said force transducer, an improved platform comprising;
   a. a thin, slab-shaped body of generally uniform thickness and having a generally flat upper surface, said body having a generally polygonal plan-view shape and including a base section and a substantially concentric boss section of somewhat smaller dimensions protruding upwards from said base section, the junction between the perimeter of the front and side portions of said boss section and said base section defining a ledge having in plan-view the shape of an open polygon,
   b. a bail having a plan-view shape and size similar to that of said ledge,
   c. attachment means for joining said bail to said slab-shaped body in a manner permitting said bail to be pivoted upward and rearward from a non-operating position resting horizontally on said ledge to an upright operable position, and
   d. stop means for limiting rearward pivotal motion of said bail.

18. The weighing scale of claim 17 wherein said attachment means is further defined as comprising in combination;
   a. a pair of axially aligned short legs projecting laterally inwards from opposite rear end portions of said bail, and
   b. a pair of axially aligned bores, one each extending laterally inwards into an opposite side wall of said boss section, near the rear edge thereof.

19. The weighing scale of claim 18 wherein said stop means is further defined as a lug positioned below at least one of said bores.

20. The weighing scale of claim 18 wherein said slab-shaped body is further defined as having a generally rectangular plan-view shape.

21. The weighing scale of claim 20 wherein said boss section of said slab-shaped body is further defined as having formed in the upper surface thereof a plurality of laterally disposed, longitudinally spaced apart grooves, said grooves being adapted to receive the lower edge of a mailing envelope.

22. The weighing scale of claim 18 wherein said slab-shaped body is further defined as having a generally circular plan-view shape.

23. The weighing scale of claim 22 wherein said boss section of said slab-shaped body is further defined as having formed in the upper surface thereof a plurality of laterally disposed, longitudinally spaced apart grooves, said grooves being adapted to receive the lower edge of a mailing envelope.

* * * * *